(12) United States Patent
Sadler et al.

(10) Patent No.: US 6,483,091 B1
(45) Date of Patent: Nov. 19, 2002

(54) METHOD AND APPARATUS FOR DYNAMIC FOCUS CONTROL WITH ERROR REJECTION

(75) Inventors: John W. Sadler, Belmont, CA (US); Kenneth L. Staton, San Carlos, CA (US)

(73) Assignee: Agilent Technologies, Inc., Palo Alto, CA (US)

(*) Notice: Subject to any disclaimer, the term of this patent is extended or adjusted under 35 U.S.C. 154(b) by 0 days.

(21) Appl. No.: 09/427,967

(22) Filed: Oct. 27, 1999

(51) Int. Cl.$^7$ .................................................. G01J 1/20

(52) U.S. Cl. .................................. 250/201.2; 250/201.5

(58) Field of Search ........................... 250/201.3, 201.2, 250/201.1, 201.8, 201.5; 369/44.34, 44.35, 44.36, 44.32, 44.27

(56) References Cited

U.S. PATENT DOCUMENTS

| | | | | |
|---|---|---|---|---|
| 4,532,420 A | * | 7/1985 | Nakajima | 250/201.8 |
| 5,097,458 A | * | 3/1992 | Suzuki | 369/44.27 |
| 5,672,861 A | * | 9/1997 | Fairley et al. | 250/201.3 |

* cited by examiner

Primary Examiner—Stephone Allen

(57) ABSTRACT

An inner control loop controls the relative position of a surface to be scanned with respect to a focal plane. An outer control loop responds to the location of the surface to be scanned with respect to a focal plane of the scan lens to generate a setpoint for the inner control loop. A sample-and-hold element disposed between the inner and outer control loops is switched by an edge or defect detector. It is preferred that the outer control loop has a time constant in the range of three to ten times longer than that of the inner control loop. The sample-and-hold element provides a gradual state transition upon the occurrence of an edge or a surface defect.

15 Claims, 3 Drawing Sheets

METHOD AND APPARATUS FOR DYNAMIC FOCUS CONTROL WITH ERROR REJECTION

BACKGROUND OF THE INVENTION

This invention relates to dynamic automatic focusing while scanning a surface and more particularly to a dynamic autofocus control system that rejects discontinuities such as inclusions and edges in the reflectivity of the surface being scanned thereby avoiding transient errors on the parts of the surface that are of interest.

In laser fluorescence scanning of nucleic acid arrays, depth discrimination is required to eliminate fluorescence (and scattering) from materials other than the surface-bound nucleic acids, and a uniform transfer function (illumination to emission sensitivity) across the scanned surface is also desirable. Some optical surface scanning applications require depth discrimination comparable to the expected flatness of the surface to be scanned. Stringent depth discrimination, however, tends to result in brightness non-uniformity unless the surface being scanned is flat compared to the depth discrimination length.

Most laser fluorescence scanners in the field of fluorescence scanning of nucleic acid arrays are of the fixed focus variety. As a result, these scanners must trade depth discrimination for brightness uniformity. The designers of fixed focus scanners generally choose lower depth discrimination ($\geq$100 microns), effectively reducing sensitivity of their instruments by allowing more spurious background signal into the measurement. Some scanners (e.g., the Hewlett-Packard GeneArray® Scanner) use a static focus mechanism. Static focus assumes that the surface of interest is planar, measures focus at three points of the surface, and aligns the surface to minimize focus error at these three points. This approach is clearly immune to transient effects while scanning because it makes no attempt to focus while scanning. On the other hand, such a system does not focus optimally on surfaces that are not flat. Typical glass microscope slides have commonly observed deviations from perfect flatness on the order of 10 microns peak-to-peak rising to 50–100 microns when inserted into a mechanical holder or cartridge under scanning conditions. The design goal for depth discrimination in high performance scanners of biological materials is typically below 50 microns.

In another scanning context, compact disk (CD) players use a dynamic focusing servo system that measures reflectivity of the surface to position the scan lens. However, scratches and surface imperfections can cause transient effects that drive the focus system away from the desired operating point. CD players compensate for some level of surface irregularities by incorporating large amounts of redundant data into the CD, and by dispersing local data across the surface so that point defects do not affect consecutive bits of the data stream. CD's have the added advantage that they are round and so do not require the laser beam to scan beyond the surface as is required when scanning a rectangular slide in a reciprocating or raster motion which is used in the scanning of biological materials.

Thus, a problem in any practical realization of dynamic autofocus by reflection is that the surface is never perfect; dirt and inclusions (bubbles, more dirt) change the reflectivity of the surface in bursts. Further, the surface to be scanned may be smaller than the travel of the illuminating beam so that the focus signal is discontinuous at the edge and ill-behaved beyond it. In either case, transient signals are fed through the focus servo system and disturb its response for some time afterwards, propagating focus errors to other parts of the surface which may themselves be flat and clean. It is therefore desirable to focus dynamically while executing a scan over a surface with discontinuous reflectivity such as in raster scanning wherein the scan profile crosses the bounds of the surface, or scanning a surface with scratches, dust, dirt, or inclusions.

SUMMARY OF THE INVENTION

In one aspect, the dynamic focus control of the invention includes a lens system having a focal plane and a scanning surface for receiving light from the lens. A position sensor generates a position signal and a focus transducer alters the relative positions of the focal plane and the surface. An inner control loop is responsive to the position signal to drive the transducer and an outer control loop responds to deviation in the relative position of the scanning surface with respect to the focal plane of the lens from a focus setpoint to generate an error signal. The error signal is used to form a position setpoint for the inner control loop. A sample-and-hold functional element is disposed between the inner and outer control loops and is switched by an edge or defect detector.

In a preferred embodiment, the outer control loop has a time constant in the range of three to ten times longer than that of the inner control loop. It is also preferred that the sample-and-hold element provide a gradual state transition such as a timed "dissolve" in which the output is equal to the "held" input during the hold state and smoothly changes to equal the "sample" input sometime after the transition from hold state to sample state. In another embodiment, the sample-and-hold element delays transition from hold mode to focus mode until the focus loop position setpoint is within a selected tolerance of the held position. A comparator may be provided for receiving expected position of an edge and actual scan position to clock transition from focus mode to position mode. Surface reflectivity may be used to sense an edge or an edge may be sensed from rapid changes in reflectivity alone or in combination with reflectivity itself. The edge or defect detector may also sense a surface property correlated with the presence of inclusions, dirt or scratches. In yet another embodiment, the edge or defect detector employs pre-scanning of the surface to form a map of inclusions which can be used to reject errors by feeding this information forward to a controller during scanning.

DESCRIPTION OF THE PREFERRED EMBODIMENT

Figure 1:
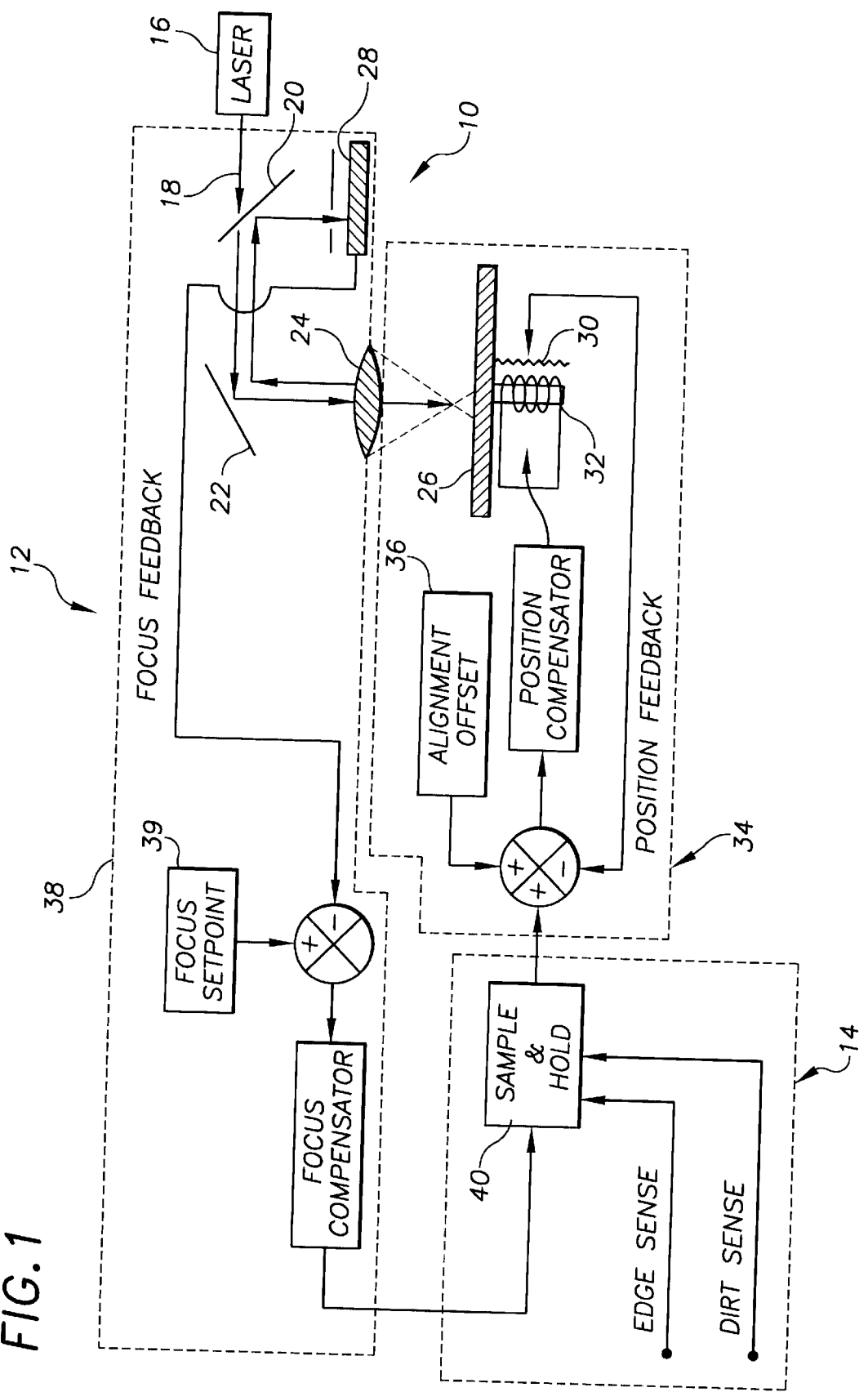
FIG. 1 is a block diagram of the dual loop dynamic focus system of the invention.

With reference to FIG. 1, a dynamic focus system 10 of the invention includes a cascaded dual loop servo system 12 and defect/edge detection system 14. The cascaded dual loop servo system 12 by itself provides considerable rejection of point defects. The addition of the defect and edge detection system 14 improves this rejection and makes it possible to recover from edge effects with very little degradation in focus performance near the edges of a surface, even when the laser must transition off the surface in order to execute a scan profile.

In an embodiment of the overall system, a laser 16 generates a collimated beam 18. The beam 18 passes through a beam splitter 20 and is reflected by a mirror 22 onto a scanning lens 24 off center. The beam 18 intersects a scanning surface 26 and is reflected from the surface 26 through the scanning lens 24 and directed by the beam splitter 20 onto a non-contact position sensor such as a position sensitive detector (PSD) 28 which measures lateral beam offset. A position sensor 30 measures the position of the scanning surface 26 (or chip holder) with respect to a focus transducer 32. This position is controlled by the focus transducer 32 which alters the distance between the scanning surface 26 and the scan lens 24. The focus transducer 32 is controlled by an inner servo loop 34 which maintains the position of the scanning surface 26 at a desired setpoint location such as at the focal plane of the lens 24. The setpoint location may be altered away from the focal plane by an alignment offset 36 if desired. It will be appreciated by those skilled in the art that a lens system may be used having either a fixed focal length as illustrated in FIG. 1 or a variable focal length for adjusting the relative positions of the focal plane and scanning surface. In the latter case, the transducer alters the focal length of the lens system.

An outer control loop 38 compares a focus setpoint 39 with a signal from the position sensitive detector 28 to generate a setpoint for the inner control loop 34. It is noted that as the surface 26 deviates from the focal plane of the lens 24 (or a selected offset therefrom), the beam will move laterally across the PSD 28 to generate a signal for comparison with the focus setpoint 39. The outer control loop 38 preferably has a time constant of from three to ten times longer than the inner control loop 34.

The edge and defect detector 14 effectively switches a sample-and-hold functional element 40 that is interposed between the outer and inner control loops 38 and 34. When the detector 14 senses a defect or edge, it switches to position hold mode so that the inner loop 34 setpoint remains constant. When the detector 14 senses no defect or edge, it passes the position setpoint from the outer servo loop 38 to the inner control loop 34. Mode switching transients can be reduced by either, or a combination of,:

1. Modifying the sample-and-hold device 40 (which may be implemented as software code in a digital controller) to provide a gradual state transition. One embodiment involves a timed "dissolve" wherein the output is equal to the "held" input during the hold state, and smoothly changes to equal the "sample" input some time after the transition from hold state to sample state. The held setpoint and sample setpoint are combined by a relation $Y=S*p+H*(1-p)$. In this relation, S represents the sample setpoint (time varying) and H represents the hold setpoint. Y is the output of the modified sample-and-hold circuit, and p is an independent parameter that takes the value zero when in the hold state, one when in the sample state. The parameter p varies smoothly between 0 and 1 over some preset time interval to make a smooth transition from hold state to sample state. In contrast, the change from sample state to hold state should be abrupt, since the focus system does not adapt to reflection signals when the edge or dirt detector encounters a region to ignore.

2. Delaying the transition from hold mode to sample (focus) mode until the focus loop position setpoint is within some selected tolerance of the held position.

An edge sense signal in the defect/edge detection system 14 can be constructed by feeding the expected position of each edge and the actual scan position to a comparator, and using this comparison to trigger the transition from focus mode to position hold mode. Edge sense could also involve a measurement of surface reflectivity or another surface characteristic. Surface inclusions, dust, dirt, and scratches may be detected by direct reflectivity measurements fed to a pair of comparators (dirt sense in FIG. 1) designed to discriminate reflectivities outside the expected range for an intact surface. The signal from this comparator pair can be logically combined with the edge detector to control the focus (outer) loop's mode.

Alternative methods for detecting undesirable surface properties include (but are not limited to):

1. Sensing rapid changes in reflectivity alone or in combination with reflectivity itself.

2. Sensing some other surface property that is convenient and well correlated with the presence of inclusions, dirt, or scratches.

3. A feed forward aspect can also be applied advantageously to the focus controller (outer loop 38) by measuring the surface flatness and feeding anticipated focus errors into the loop 38 as a position forcing function using one or more previous lines.

4. Pre-scanning the surface and forming a map of inclusions by any method, and feeding this information forward to the controller while scanning.

Figure 2:
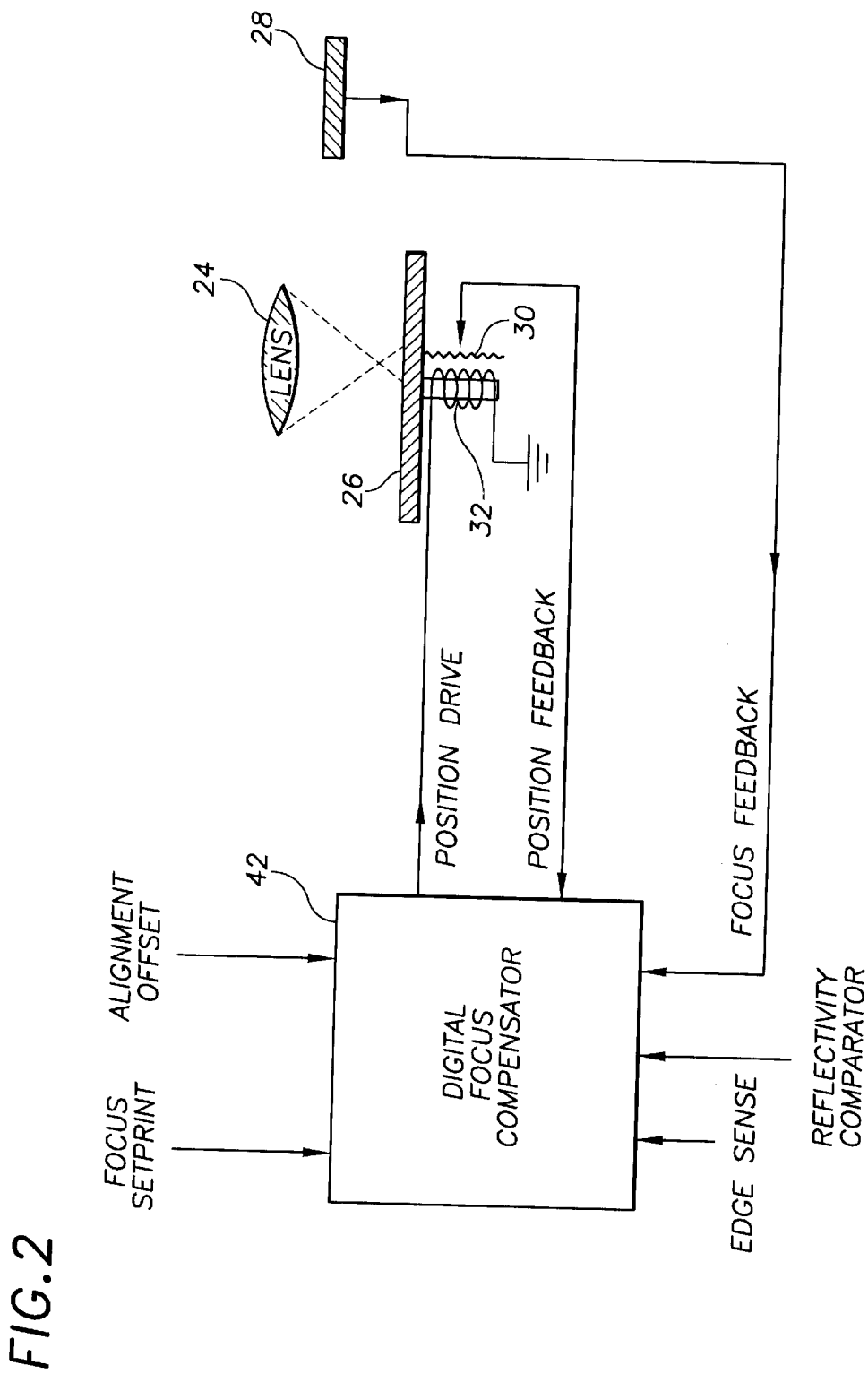
FIG. 2 is a block diagram of digital focus compensator connections showing inputs and outputs.

With reference now to FIG. 2, a digital controller or digital focus compensator 42 implements all of the compensation utilized in the embodiment of FIG. 1.

Figure 3:
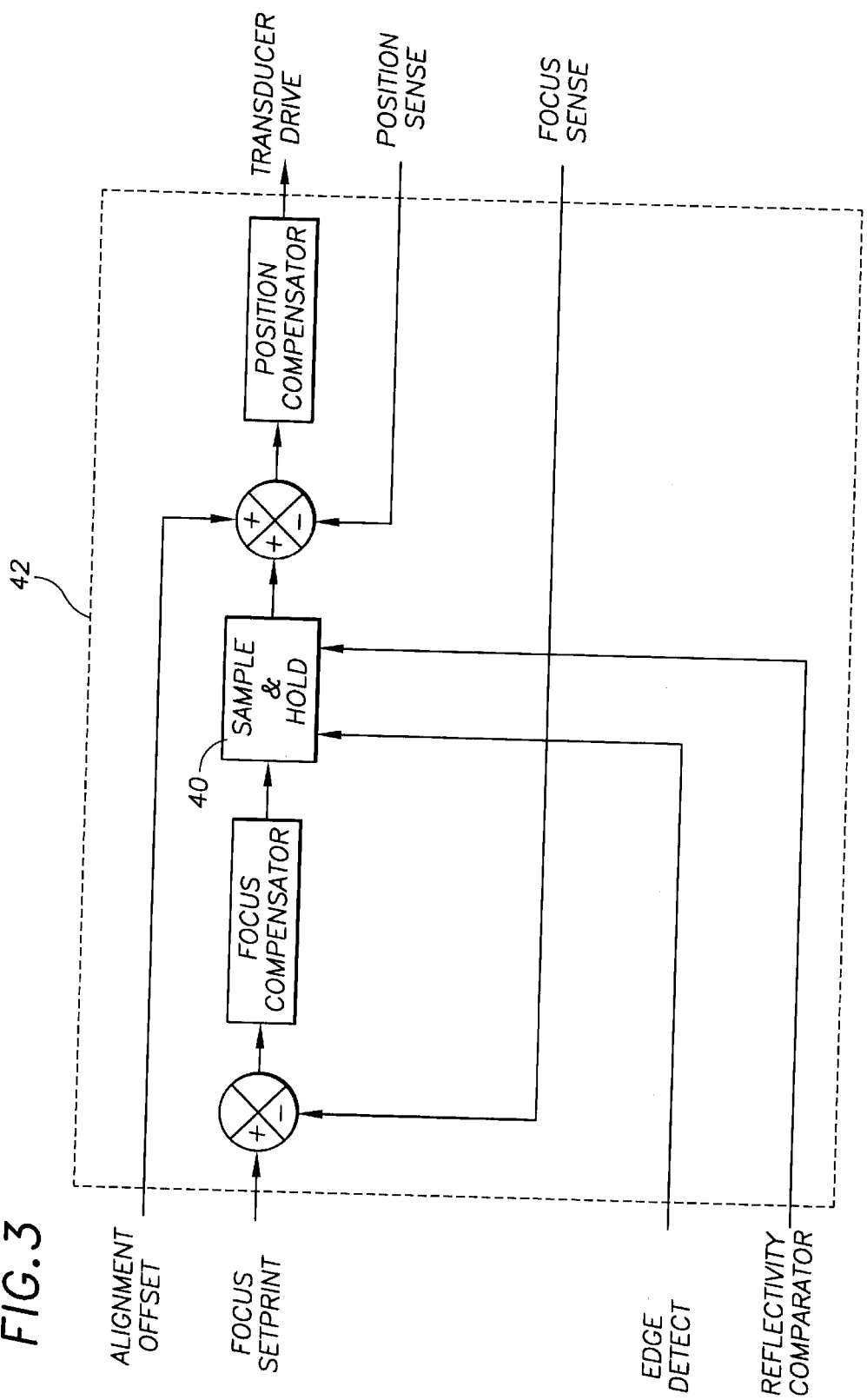
FIG. 3 is a block diagram of an internal structure of the digital focus compensator of FIG. 2.

FIG. 3 depicts a possible internal structure of the digital compensator 42 of FIG. 2. Note that the edge detect and reflectivity comparator may be derived from other signals that are processed by the digital controller 42.

The invention disclosed herein makes it possible to focus dynamically while executing a scan over a surface with discontinuous reflectivity as in raster scanning where the scan profile crosses the bounds of the surface, or while scanning a surface with scratches, dust, dirt or inclusions. The inner positioning loop 34 makes it possible to add an alignment offset 36 as shown in FIG. 1. Such alignment offset makes it possible to eliminate a mechanical alignment step associated with positioning the focus mechanism near the desired focus position in order to avoid, for example, inadvertently focusing on the wrong surface of a glass slide. Other advantages are the use of index (framing) for position hold; use of an outer loop d(pos)/dt for position hold; and use of an inner loop only to find the correct scanning surface.

It is recognized that modifications and variations of the invention disclosed herein will be apparent to those skilled in the art and it is intended that all such modifications and variations be included within the scope of the appended claims.

What is claimed is:

1. Dynamic autofocusing apparatus comprising:
   a lens system having a focal plane;
   a scanning surface for receiving light from the lens system;
   a position sensor for measuring the position of the surface with respect to the focal plane to generate a position signal;
   a transducer for altering the relative position of the focal plane and the surface;
   an inner control loop responsive to the position signal and a position setpoint to control the transducer to set the relative position of the focal plane and the scanning surface;
   an outer control loop responsive to deviation in the relative position of the scanning surface with respect to the focal plane of the lens from the focus setpoint to generate an error signal, the error signal forming the position setpoint to the inner control loop; and a sample-and-hold functional element disposed between the inner and outer control loops, the sample and hold element switched between sample and hold states by an edge or defect detector.

2. The dynamic autofocusing apparatus of claim 1 wherein the outer control loop has a time constant in the range of three to ten times longer than the inner control loop.

3. The dynamic autofocusing apparatus of claim 1 wherein the sample-and-hold element provides a gradual state transition.

4. The dynamic autofocusing apparatus of claim 3 wherein the gradual state transition involves a timed dissolve.

5. The dynamic autofocusing apparatus of claim 3 wherein the sample-and-hold element delays transition from hold mode to focus mode until outer loop position setpoint is within a selected tolerance of held position.

6. The dynamic autofocusing apparatus of claim 1 further including a comparator for receiving expected position of an edge and actual scan position to trigger transition from a focus mode to a position hold mode.

7. The dynamic autofocusing apparatus of claim 6 further including a surface reflectivity detector to sense edge.

8. The dynamic autofocusing apparatus of claim 7 wherein the surface reflectivity detector senses rapid changes in reflectivity alone or in combination with reflectivity itself.

9. The dynamic autofocusing apparatus of claim 1 wherein the edge and defect detector is adapted for sensing a surface property correlated with presence of inclusions, dirt or scratches.

10. The dynamic autofocusing apparatus of claim 1 wherein the edge and defect detector employs pre-scanning or previous scan of the surface to form a map of inclusions.

11. Dynamic autofocusing apparatus comprising:

an inner control loop for controlling to a setpoint the relative position of a surface to be scanned with respect to a focal plane of a lens system;

an outer control loop responsive to the location of the surface to be scanned with respect to the focal plane of the scan lens system to generate the set point for the inner control loop; and a sample-and-hold element disposed between the inner and outer control loops and switched between sample and hold states by an edge or defect detector.

12. Dynamic autofocusing apparatus comprising:

a lens system having a focal plane;

a scanning surface for receiving light from the lens;

a position sensor for measuring the position of the surface with respect to the focal plane to generate a position signal;

a transducer for altering the relative positions of the focal plane and surface;

an inner control loop responsive to the position signal and to a position setpoint to control the transducer to set the relative position of the focal plane and the scanning surface;

an outer control loop responsive to deviation in the relative position of the scanning surface with respect to the focal plane of the lens from the focus setpoint to generate an error signal, the error signal forming the position setpoint to the inner control loop, wherein the outer control loop has a time constant in the range of three to ten times longer than a time constant of the inner control loop.

13. Dynamic autofocusing method comprising:

controlling the relative position of a surface to be scanned with respect to a focal plane of a lens to be a setpoint location;

detecting the location of the surface to be scanned with respect to the focal plane of the scan lens to generate the setpoint location; and switching a sample-and-hold element between sample and hold states in response to an edge or defect detector.

14. The dynamic autofocusing method of claim 13 adapted for scanning an addressable array following exposure to a sample.

15. The method of claim 14 wherein the addressable array includes a biopolymer array.

* * * * *